United States Patent Office 3,758,416
Patented Sept. 11, 1973

3,758,416
PROCESS FOR PRODUCING CATALYSTS FOR DIMERIZATION OF PROPYLENE
Lucio Forni, Milan, Italy, assignor to Societa Italiana Resine S.p.A., Milan, Italy
No Drawing. Filed Nov. 19, 1971, Ser. No. 200,508
Claims priority, application Italy, Nov. 26, 1970, 32,210/70
Int. Cl. B01j
U.S. Cl. 252—447                                        7 Claims

ABSTRACT OF THE DISCLOSURE

Catalysts for the production of 4-methyl-1-pentene are made by treating graphite with alkaline solutions and subsequently heating to an elevated tempertaure in nitrogen or other inert gas before adding an alkali metal, preferably potassium.

---

The present invention relates to improvements in the production of 4-methyl-1-pentene.

More particularly, the present invention relates to improvements in the catalyst used in the production of 4-methyl-1-pentene by dimerization of propylene.

It will be well-known that 4-methyl-1-pentene can be used in the production of polymers of interesting applications, more precisely for polymers characterised by high crystallinity and transparency, excellent mechanical and electrical properties, high stability and resistance to chemical agents.

Such polymers can be advantageously used in the manufacture of transparent articles, sanitary articles, containers and lining foils for the conservation of foodstuffs, components for electrical equipment etc.

The polymers of 4-methyl-1-pentene are normally prepared by Ziegler type catalytic polymerisation of 4-methyl-1-pentene in moderate conditions.

In order to obtain polymers with the above-described properties, particularly high crystallinity and transparency, it is necessary to use particularly pure 4-methyl-1-pentene.

It is already known that 4-methyl-1-pentene is normally produced by dimerization of propylene in the presence of catalysts consisting of alkali metals carried on graphites.

However, such processes have the disadvantage of not being characterised by high selectivity for 4-methyl-1-pentene on account of the contemporary production of substantial quantities of other isomers of 4-methyl-1-pentene. In practice, around 85% selectivity can be attained exceptionally, the usual values being comprised between 50 and 65%, the remainder being cis-4-methyl-2-pentene, trans-4-methyl-2-pentene, 2-methyl-1-pentene, 2-methyl-2-pentene, 1-hexene, cis-2-hexene, trans-2-hexene, cis-3-hexene and trans-3-hexene.

It is however necessary to subject the reaction mixture to troublesome operations of purification and sometimes, on account of the large quantity of isomers, to isomerisation processes in respect of the by-products in order to recover useful product.

The object of the present invention is a process for the production of 4-methyl-1-pentene by dimerization of propylene, the result having a high selectivity.

A further object of the present invention is a catalyst consisting of alkali metals, by themselves or in mixture, supported on graphite, for the production of 4-methyl-1-pentene with high selectivity.

It is a further object of the present invention to provide a process for the production of a catalyst consisting of alkali metals, by themselves or in mixture, supported on graphite, characterised by high selectivity for 4-methyl-1-pentene in the processes of dimerization of propylene.

This process consists essentially in subjecting to initial treatment with alkaline solutions graphites of, preferably, controlled granulation, in heating the products obtained in a stream of nitrogen or other inert gas at elevated temperature, in adding to the thus treated graphite, at a temperature of 150 to 180° C., alkali metals, by themselves or in mixture, and in heating such a mixture to high temperature under agitation.

The essential aspect of the present invention is the initial treatment of the graphite with alkaline solutions and subsequent heating to elevated temperature in a stream of nitrogen, or other inert gas.

More precisely, the particles of graphite, preferably ground and sieved so as to achieve a granulation comprised between 10 and 30 mesh, are suspended in an aqueous alkaline solution of normality comprised between 0.001 and 2.0 so that 1 g. of graphite is suspended in a quantity of alkaline solution ranging from 2 to 10 g. and preferably 3 to 5 g.

The suspension is then raised to a temperature in excess of 40° C. and preferably to boiling, for not less than 30 minutes and preferably from 30 minutes to 4 hours.

In one embodiment of the present invention, the graphite, after treatment with an approximately 1 N aqueous solution of potassium hydroxide under the above-mentioned conditions, is, after separation of the alkaline solution, subjected to repeated washings in hot and preferably boiling water until the washing liquors are completely neutralised.

After drying for at least 5 hours at a temperature of between 100 and 150° C., the graphite is ready to be used as a support for the catalyst.

For this purpose, such graphite is heated in a weak flow of inert gas for a period ranging from 1 to 5 hours at a temperature of 200 to 300° C. and is then allowed to cool to a tempertaure of 150 to 180° C. Subsequently, the graphite thus obtained has preferably added to it an alkali metal, preferably potassium, which has been carefully washed and maintained under xylene, so that the final content of alkali metal in the graphite is comprised between 1 and 35% and is preferably between 10 and 25% by weight.

The temperature of the mixture, under agitation and in a stream of inert gas, is then raised to a level not exceeding 350° C. and preferably between 220 and 260° C., and is maintained thus for a period ranging from 1 to 10 minutes and preferably 2 to 4 minutes.

After cooling, the catalyst is ready for the process of dimerisation of propylene usually with a selectivity for 4-methyl-1-pentene in excess of 85%, other conversion values being maintained.

For this purpose, the catalyst must be retained and handled constantly under nitrogen, even during the transfer to the dimerisation reactor.

This catalyst is used in the dimerization of propylene under the conditions normally used with catalysts which are based on the graphite supported alkali metals already known in the art.

More particularly, the best results are obtained by working with 5 to 50 parts liquid propylene per part of catalyst and per hour at a temperature of 100 to 260° C. at pressures of 20 kg./sq. cm. to 350 kg./sq. cm.

The present invention will now be illustrated by the following examples which are not intended to imply any limitation on the invention itself.

EXAMPLE 1

10 g. of graphite of a granulation comprised between 10 and 30 mesh were suspended in 50 ml. of a 1 N solution of potassium hydrate and the whole was raised to boiling for 1 hour. After separation of the alkaline solution and a few washings in boiling water until the washing liquors are neutralised, the graphite was dried for 12 hours at 130° C.

Subsequently, the graphite which had just been treated, after having been heated for 1 hour at 250° C. in a weak flow of nitrogen and then allowed to cool to 150° C., had potassium added to it after the latter had been carefully washed and maintained under xylene in such a quantity that the content of potassium in the mixture was equal to 22% by weight.

This mixture, under agitation and in a stream of nitrogen, was raised to 250° C. and maintained at that temperature for 3 minutes approx.

6 g. of the resultant catalyst, after cooling, were charged into a tubular reactor operating at 150° C. and 70 kg./sq. cm.

In a test lasting 6 hours, in which the said reactor was fed with 20 parts liquid propylene per part of catalyst and per hour, a conversion rate of 15.7% of the propylene supplied was achieved, with a selectivity of 85.7% in 4-methyl-1-pentene of 13.6% of other dimers and 0.7% of heavy products.

EXAMPLE 2

6 g. of the catalyst, produced as in 1, were charged into a tubular reactor operated at 170° C. at 80 kg./sq. cm. In a test carried out as in 1, a conversion rate of 18.5% of the propylene supplied, with selectivity of 86.3%, to 4-methyl-1-pentene was achieved, conversion amounting to 13% to other dimers and 0.7% to heavy products.

EXAMPLE 3

Proceeding as in the conventional technique, potassium, carefully washed and maintained under xylene, was added to graphite which had not been subjected to any pretreatment, in such a quantity that its content in the mixture was equal to 22% by weight.

The said mixture, under agitation and in a stream of nitrogen, was raised to 250° C. and maintained at that temperature for 3 minutes approx.

6 g. of the catalyst thus produced were charged into a tubular reactor operating at 170° C. and 80 kg./sq. cm. In a test carried out as in Example 1, 15% conversion of propylene with a selectivity of 55.2% to 4-methyl-1-pentene was achieved, 43.5% conversion to other isomers and 1.3% to heavy products.

What I claim is:

1. A process for the production of catalysts consisting of graphite-supported alkali metals suitable for the preparation of 4-methyl-1-pentene by dimerization of propylene, characterised:

by suspension of the graphite in an aqueous alkaline solution of normality comprised between 0.001 and 2.0 in such a way that 1 g. of graphite is suspended in a quantity of alkaline solution ranging from 2 to 10 g.;

by raising the temperature of such a suspension to a value exceeding 40° C. and maintaining the temperature at that level for a time exceeding 30 minutes;

by separating the alkaline solution from the graphite;

by washing the said graphite with hot water until the washing liquors are completely neutralised;

by drying the graphite thus obtained for at least 5 hours at 100 to 150° C.;

by heating the graphite obtained in a weak flow of inert gas for 1 to 5 hours at a temperature of between 200 and 300° C.;

by adding to the graphite obtained, after cooling to 150 to 180° C., an alkali metal such that its final content in the graphite is comprised between 1 and 35% by weight;

by raising the temperature, under agitation and in a stream of inert gas, to a level not exceeding 350° C. and maintaining it thus for a period off rom 1 to 10 minutes.

2. A process according to claim 1, in which the temperature of a level not exceeding 350° C. is a temperature of 220° to 260° C.

3. A process according to claim 1, in which the time of 1 to 10 minutes is a time of 2 to 4 minutes.

4. A process according to claim 1, characterised by suspension of the graphite in such a way that 1 g. of graphite is suspended in a quantity of alkaline solution ranging from 3 to 5 g., and then maintaining it at boiling for a period ranging from 30 minutes to 4 hours.

5. A process according to claim 1, characterised in that, as an alkaline solution, approximately 1 N potassium hydroxide is used.

6. A process according to claim 1, characterised by the addition to the graphite of an alkali metal, in such a way that its final content in the graphite is comprised between 10 and 25% by weight.

7. A process according to claim 1, characterised in that metallic potassium is used as the alkali metal.

References Cited

UNITED STATES PATENTS

| | | | |
|---|---|---|---|
| 3,278,634 | 10/1966 | Mägerlein et al. | 260—683.15 E |
| 3,311,673 | 3/1967 | Hall et al. | 260—683.15 E |
| 3,325,559 | 6/1967 | Yeo et al. | 260—683.15 E |
| 3,340,323 | 9/1967 | Mägerlein et al. | 252—447 X |

OTHER REFERENCES

Chemical Abstracts, vol. 57, 16395e (1962).

HELEN M. S. SNEED, Primary Examiner

U.S. Cl. X.R.

260—683.15 E